UNITED STATES PATENT OFFICE 2,538,741

MONOAZO-DYESTUFFS AND PROCESS OF MAKING SAME

Willi Widmer, Bottmingen, and Ernst Reich, Neue Welt, Switzerland, assignors to Ciba Limited, Basel, Switzerland, a Swiss firm No Drawing. Application September 18, 1947, Serial No. 774,880. In Switzerland October 1, 1946

5 Claims. (Cl. 260—207)

According to this invention valuable new monoazo-dyestuffs, free from sulphonic acid groups are made by coupling a diazo-compound of an amine of the general formula

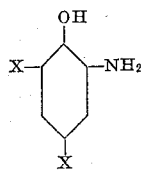

in which one X represents an acylamino group and the other X a nitro group, with a hydroxybenzene which is capable of coupling in ortho-position with respect to the hydroxyl group, and, if desired, treating the resulting dyestuff with an agent yielding metal.

The acyl residue in the amine of the above formula used as starting material may be, for example, of aromatic, and especially aliphatic, character. Among others there come into consideration the following acyl residues; oxalyl, sulphobenzoyl, phthalyl, and preferably formyl or acetyl.

Among the hydroxybenzenes capable of coupling in ortho-position with respect to the hydroxyl group used as azo-components there are suitable principally those which contain in para-position with respect to the hydroxyl group an aliphatic hydrocarbon radical containing up to 3 carbon atoms, preferably a methyl group. Accordingly, the following compounds may be mentioned as examples of azo-components for the present invention: 4-methyl-1-hydroxybenzene, 4-isopropyl-1-hydroxybenzene, 2:4- or 3:4-dimethyl - 1 - hydroxybenzene, 2 - acetylamino - 4 - methyl-1-hydroxybenzene, and also 4-acetylamino - 3 - methyl - 1 - hydroxybenzene, 4 - acetylamino - 3:5 - dimethyl - 1 - hydroxybenzene and 4-chloro-1-hydroxybenzene.

The amines of the above formula can be diazotised by methods in themselves known, for example, with the aid of mineral acids, especially hydrochloric acid and sodium nitrite. The coupling of the resulting diazo-compound with the phenol capable of coupling in ortho-position with respect to the hydroxyl group is advantageously carried out in an alkaline medium, if desired, with the addition of a neutral or basic solvent, for example, alcohol, pyridine, ethanolamine or the like.

In some cases the above dyestuffs can be made by an alternative process, in which a monoazo-dyestuff of the general formula

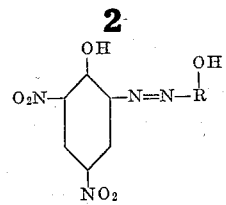

in which R represents a benzene residue coupled in ortho-position with respect to the hydroxyl group, is reduced to convert one of the nitro groups into an amino group, and the resulting amino group is subsequently converted into an acyl-amino-group.

The monoazo-dyestuffs of the above formula used as starting materials in the latter process can be made, for example, by coupling a diazotised 4:6 - dinitro - 2 - amino - 1 - hydroxybenzene with an hydroxybenzene capable of coupling in ortho-position with respect to the hydroxyl group. The reduction of the dinitro-azo-dyestuff to the nitro-amino-azo-dyestuff is carried out under such conditions that neither the azo-group nor the second nitro group is attacked. For this purpose there are suitable, for example, alkali sulphides or alkali hydrosulphides. The conversion of the amino group into an acylamino group in the resulting dyestuff may be brought about, for example, with the aid of an acid halide such as an acid chloride, or an acid anhydride. In this manner there may be introduced into the dyestuff molecule the acyl residues which have been mentioned above as acyl residues present in the diazo-components used as starting materials in the process first described above.

The new monoazo-dyestuffs obtainable by either of the foregoing processes are free from sulphonic acid groups and correspond to the general formula

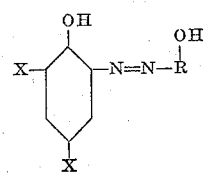

in which one X represents an acylamino group and the other X a nitro group, and R represents a benzene radical bound to the azo-group in ortho-position to the OH-group.

These new products can be used for dyeing or printing various fibres, but principally fibres of animal origin such as wool, silk or leather. Especially valuable products are obtained by treating the dyestuffs obtainable by the invention with an agent yielding metal. This treatment may be carried out in known manner in substance, in the dyebath or on the fibre. Thus, the metallisation in substance may be carried out, for example, with an agent yielding chromium, in a neutral or alkaline medium, in the presence or absence of suitable additions, for example, aromatic ortho-hydroxy-carboxylic acids, neutral salts or bases, organic solvents or further additions favouring the formation of complexes, and under atmospheric or superatmospheric pressure. The metallisation in the dyebath or on the fibre may also be carried out in known manner, for example, with the addition of neutral chromates and ammonium salts.

In accordance with the invention there are obtained, among others, dyestuffs which dye wool by the usual chroming process very fast, especially with respect to light, for example, brown tints.

The following examples illustrate the invention, the parts and percentages being by weight unless otherwise stated, and the relationship of parts by weight to parts by volume being the same as that of the kilogram to the litre:

Example 1

21.1 parts of 4-nitro-6-acetylamino-2-amino-1-hydroxybenzene are diazotised at 5–10° C. in 25 parts of water, 15 parts by volume of hydrochloric acid of 30 per cent. strength and 25 parts by volume of a 4 N-solution of sodium nitrite with the addition of 30 parts of ice and external cooling. The suspension of the diazo-compound is neutralised by the addition of sodium carbonate, and introduced at 0–5° C. into a solution of 10.8 parts of 4-methyl-1-hydroxybenzene in 30 parts of water, 10 parts by volume of sodium hydroxide solution of 30 per cent. strength and 60 parts by volume of pyridine. The mixture is stirred, while allowing the temperature to rise to room temperature, until the dyestuff is formed. The precipitated dyestuff is separated by filtration, suspended in water rendered weakly alkaline with sodium carbonate, filtered, and dried. It is a black-brown powder which dissolves in hot dilute sodium carbonate solution with a red-brown coloration, and dyes wool from an acid bath red-brown tints, which when after-chromed become intense dark brown tints having excellent properties of fastness. The dyestuff is also excellently suited for dyeing by the single bath chroming process.

A dyestuff having similar properties is obtained by using in this example as starting material 6-nitro-4-acetylamino-2-amino-1-hydroxybenzene instead of 4-nitro-6-acetylamino-2-amino-1-hydroxybenzene.

Example 2

31.8 parts of the dyestuff from diazotised 4:6-dinitro-2-amino-1-hydroxybenzene and 4-methyl-1-hydroxybenzene are suspended in 300 parts of water and 30 parts by volume of sodium hydroxide solution of 30 per cent. strength. The suspension is heated at 75° C., while powerfully stirring, and mixed with a solution of 18 parts of sodium hydrosulphide of 70 per cent. strength in 20 parts of water. The partial reduction is complete in a short time. The mixture is then rapidly cooled, the solution of the reduced dyestuff is filtered, a quantity of hydrochloric acid and sodium chloride is added to the filtrate such that although the reaction mixture is still alkaline the reduction product is precipitated in the form of a brown product, and the latter is separated by filtration. The dyestuff is freed from co-precipitated sulphur by dissolution in a dilute sodium hydroxide solution, and filtration, if desired, with the aid of an adsorptive agent. If desired, the dyestuff may be purified in the following manner: It is precipitated from the solution so obtained in the form of its calcium salt by means of a solution of calcium chloride, separated by filtration, stirred in water, converted into its sodium salt by means of sodium carbonate, freed from precipitated calcium carbonate by filtration, and the sodium salt of the dyestuff is precipitated by the addition of sodium chloride and separated by filtration. In the dry state the sodium salt of the dyestuff is a black-brown powder, which dissolves in hot water with a red-brown coloration.

In order to convert the product into the acetyl-compound 28.8 parts of the dyestuff (sodium salt) so obtained is stirred into a uniform paste in 30 parts of water, and mixed at room temperature with 17 parts by volume of acetic anhydride of 97 per cent. strength. When the reaction has taken place and after the addition of 40 parts of water, the whole is heated at 80–90° C. The precipitated dyestuff acetylated at the amino group is separated by filtration, converted into its sodium salt with the necessary quantity of sodium hydroxide solution, stirred with dilute sodium carbonate solution, and, after the addition of sodium chloride, separated by filtration and dried. It is a black-brown powder, which dissolves in hot dilute sodium carbonate solution with a red-brown coloration, and dyes wool from an acid bath red-brown tints, which when after-chromed become intense dark brown tints having excellent properties of fastness. The dyestuff is also excellently suited for dyeing by the single bath chroming process.

Example 3

100 parts of well wetted wool are entered at 60° C. into a dyebath containing in 4000 parts of water 1 part of the dyestuff obtainable as described in the first paragraph of Example 1, 4 parts of acetic acid of 40 per cent. strength and 10 parts of crystalline sodium sulphate. The temperature is raised to the boil in the course of 30 minutes and dyeing is carried out at that temperature for 45 minutes. 4.7 parts of sulphuric acid of 10 per cent. strength are then added, and dyeing is continued at the boil for a further 15 minutes. The dyebath is then cooled to about 70° C., 1 part of potassium bichromate is added, the bath is raised to the boil and chroming is carried on for about 40 minutes at that temperature. The wool is dyed fast brown.

Example 4

A dyebath is prepared with 3 parts of a mixture consisting of 1.5 parts of potassium chromate and 1.5 parts of ammonium sulphate, 10 parts of Glauber salt, and 1 part of the dyestuff obtainable as described in the first paragraph of Example 1. 100 parts of well wetted wool are entered into the dyebath at 60° C., the temperature is raised to the boil in the course of 30 minutes, and boiling is continued for a further 45 minutes. There is then added 0.5 part of acetic acid of 40 per cent. strength and boiling is continued for a further 45 minutes. The wool is dyed fast brown.

What we claim is:

1. A monoazo-dyestuff free from sulphonic acid groups and corresponding to the general formula 2,538,741

5

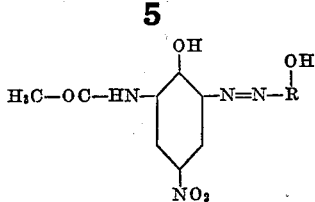

in which R stands for a benzene radical bound to the azo-group in ortho-position to the OH-group.

2. A monoazo-dyestuff free from sulphonic acid groups and corresponding to the general formula

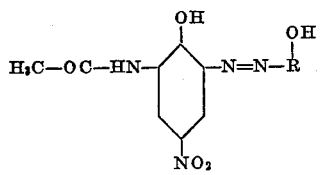

in which R stands for a benzene radical bound to the azo-group in ortho-position to the OH-group and containing a methyl group in para-position to the OH-group.

3. The monoazo-dyestuff of the formula

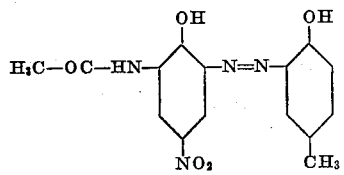

4. In the manufacture of a monoazo-dyestuff of the general formula

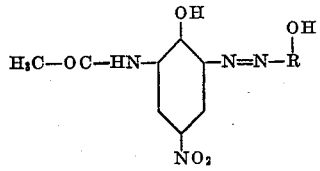

in which R stands for a benzene radical bound to the azo group in ortho-position to the OH-group, the step which comprises partially reducing by means of an alkali sulfide a dyestuff of the general formula

6

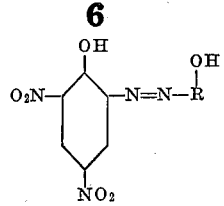

by heating the latter with said sulfide, in an amount sufficient to reduce only one nitro group, in an aqueous medium to a temperature of about 75° C.

5. In the manufacture of the monoazo-dyestuff of the formula

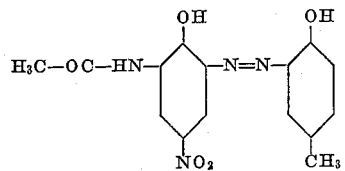

the step which comprises partially reducing by means of an alkali sulfide the dyestuff of the formula

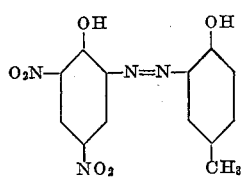

by heating the latter with said sulfide, in an amount sufficient to reduce only one nitro group, in an aqueous medium to a temperature of about 75° C.

WILLI WIDMER.
ERNST REICH.

REFERENCES CITED

The following references are of record in the file of this patent:

UNITED STATES PATENTS

| Number | Name | Date |
|---|---|---|
| 1,219,954 | Kirchhoff et al. | Mar. 20, 1917 |
| 1,408,363 | Lange | Feb. 28, 1922 |
| 2,229,200 | Wehrli | Jan. 21, 1941 |

OTHER REFERENCES

Weygand: "Organic Preparations," page 223, Interscience Publishers, N. Y., 1945.